Figure 3A:
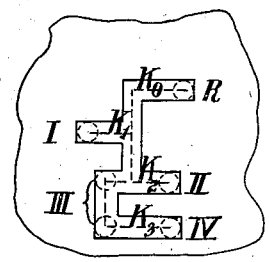

Oct. 26, 1937.  M. WAGNER  2,096,770
CHANGE SPEED GEAR
Filed Dec. 26, 1934  2 Sheets-Sheet 1
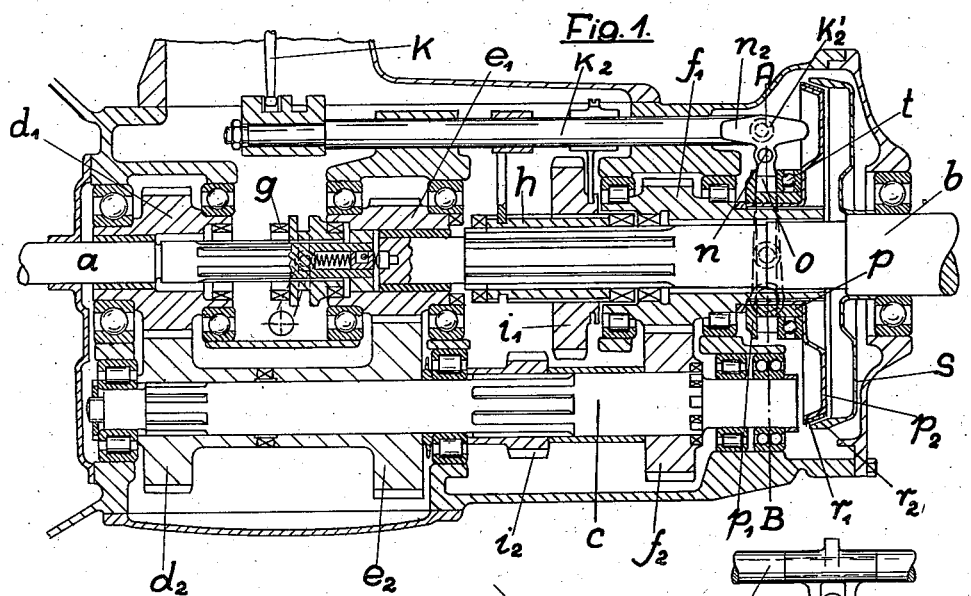
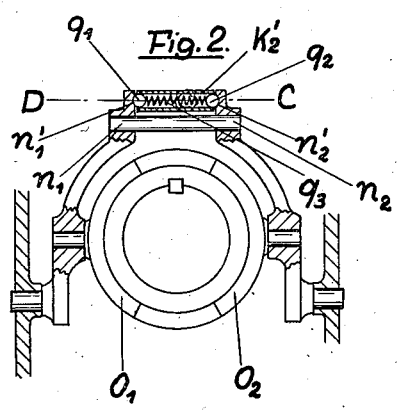
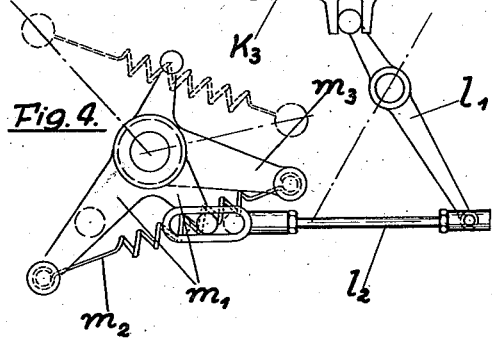
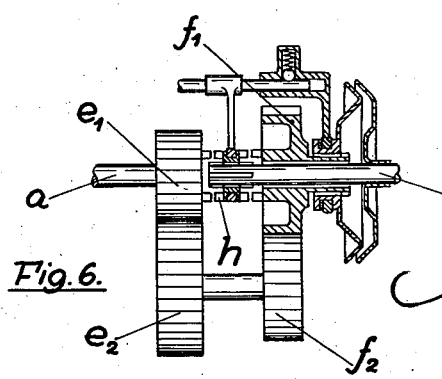
Inventor
Max Wagner Oct. 26, 1937.  M. WAGNER  2,096,770

CHANGE SPEED GEAR

Filed Dec. 26, 1934  2 Sheets-Sheet 2

M. Wagner
Inventor

Patented Oct. 26, 1937

2,096,770

UNITED STATES PATENT OFFICE 2,096,770

CHANGE SPEED GEAR

Max Wagner, Stuttgart, Germany, assignor to Daimler-Benz Aktiengesellschaft, Stuttgart-Unterturkheim, Germany Application December 26, 1934, Serial No. 759,303
In Germany December 27, 1933

10 Claims. (Cl. 74—375)

This invention relates to a change speed gear and has for its main object to make the gear changing operation considerably easier and the gear practically noiseless. The invention further relates to a particularly suitable construction and arrangement of the means for facilitating the change of gear and of the whole gear itself.

Gears with several noiseless speeds are for instance known, in which the speeds are formed by three pairs of toothed wheels which are always in mesh and are operated by means of two change-over clutches which are provided with dogs having inclined end surfaces and are changed over without a middle position of rest. This arrangement can, however, not be used in all cases, since, when both change-over clutches are operated simultaneously the re-engagement of the dogs which are inclined on one side may in some circumstances cause difficulties. For this reason auxiliary clutches have already been proposed, by means of which the disengaged parts of the gear can be reconnected with the engine or the vehicle.

The invention overcomes this disadvantage, for instance through only one dog clutch provided with inclined end surfaces being provided, while for instance for the rest a normal change-over clutch with straight dogs is provided, which is suitably connected to a separate arrangement for facilitating the change of speeds. The present invention relates more particularly to the last named arrangement. This arrangement is for instance so constructed that in one operative direction, for instance when changing down from the higher to the lower speed, it acts as a synchronizing coupling, while in the other operative direction, for instance when changing up from the lower to the higher speed, it acts as a braking device for the gear. The invention also provides for a particularly suitable mode of operation. As the synchronizing coupling, a disc or cone coupling is preferably used, which is disposed at one end of the gear. This arrangement has the advantage that the coupling can be made so large as to make a really sufficient and effective synchronization possible. As on the other hand other synchronizing couplings besides the one referred to need not be provided, there will in this case be no difficulties as regards the dimensions of the gear.

The invention provides the further advantage that the arrangement for facilitating the operation of the gear is actuated by the gear lever through transmission gear, while the coupling co-acting with it, for instance a dog clutch, sliding wheels or the like, is moved by means of the gear lever without any interposed transmission gear. Owing to this the synchronizing moment which serves for facilitating the change of speeds can be considerably increased, without however, in spite of the increase in the effective operative motion necessitated thereby, the total operative motion becoming too great owing to the direct actuation of the dog clutch. The arrangement is preferably made such that at a certain resistance in the device for facilitating the change-over, that is for instance after synchronization has been effected, this device becomes automatically disengaged during the further operative motion and the new speed can be thrown in.

In the accompanying drawings a constructional example of the invention is shown

Figure 3:
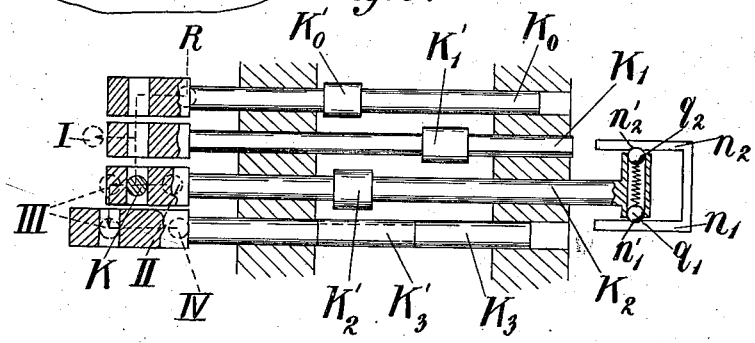

Fig. 1 being a longitudinal section through the gear,

Fig. 2 a cross-section on line A—B of Fig. 1, which shows the arrangement for facilitating the change in elevation, Fig. 3 a cross-section on line C—D of Fig. 2, Fig. 3a is a plan view of a detail.

Figure 5:
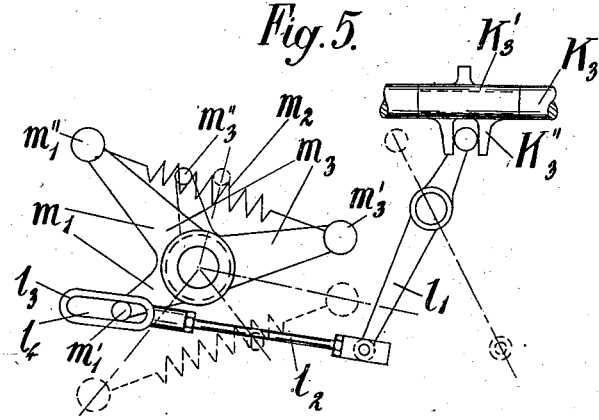

Fig. 4 an elevation of the mechanism for actuating the front change-over coupling, Fig. 5 shows the mechanism in Fig. 4 in a different position of the parts.

Fig. 6 a two-speed gear with the arrangement for facilitating the change-over operation shown diagrammatically.

In Fig. 1, $a$ is the engine coupling shaft, $b$ the Cardan shaft and $c$ the lay shaft. On the shaft $a$ is mounted loosely the toothed wheel $d_1$ which is in constant engagement with the toothed wheel $d_2$ which is fixed on the lay shaft. The same applies to the pairs of toothed wheels $e_1$—$e_2$ and $f_1$ and $f_2$ the toothed wheel $e_1$ being mounted so as to be capable of turning loosely between the shafts $a$ and $b$ with respect to these shafts and the toothed wheel $f_1$ being mounted loosely on the Cardan shaft $b$ while the toothed wheels $e_2$ and $f_2$ are fixed on the lay shaft like the toothed wheel $d_2$. All these toothed wheels are preferably provided with inclined teeth so as to render them noiseless.

Between the toothed wheels $d_1$ and $e_2$ and capable of being alternately coupled with them is a change-over coupling $g$ which is slidable on the engine coupling shaft. A further change-over coupling $h$ is provided between the toothed wheels $e_1$ and $f_1$, so as to be capable of being coupled with them. This coupling is mounted on the Cardan shaft so as to be capable of sliding thereon but not of turning. It is made in the form of a sleeve and is provided with keyways for a further sliding wheel $i_1$ which can be brought into engagement with the toothed wheel $i_2$ of the lay shaft.

For changing the speeds, as shown in Fig. 3, four selector bars $k_0, k_1, k_2, k_3$ are provided which are operated from a common operating lever $k$. The bar $k_0$ serves for putting into and out of operation by means of a fork $k_0'$ a reverse toothed wheel (not shown) which is for instance to be brought into engagement simultaneously with the toothed wheels $i_1$ and $i_2$. The bar $k_1$ through the fork $k_1'$ effects the shifting of the toothed wheel $i_1$, the bar $k_2$ serving for actuating the change-over coupling $h$ by means of the fork $k_2'$ as well as the means for facilitating the gear changing operation, hereinafter described, and the bar $k_3$ serving for actuating the change-over coupling $g$ through the actuating mechanism shown in detail in Figs. 4 and 5.

The mechanism shown in Figs. 4 and 5 is constructed as follows: On the bar $k_3$ is secured a sleeve $k_3'$ provided with a fork $k_3''$ which actuates a double-armed lever $l_1$ pivoted in the gear casing in such a manner that it can be moved out of the position shown in Fig. 4 into the position shown in Fig. 5. On the lower end of the lever $l_1$ is pivoted a bar $l_2$ which at its left hand end has a head $l_3$ with a slot $l_4$ in which engages a stud $m_1'$ provided on a bell crank $m_1$ which is rotatably mounted on a shaft $m_0$ in the gear casing, the said stud being slidable in the slot $l_4$ to a certain extent. On a stud $m_1''$ provided on the other arm of the bell crank $m_1$ is attached one end of a tension spring $m_2$, the other end of which is attached to a stud $m_3'$ on one arm of a second bell crank $m_3$ also rotatable on the shaft $m_0$. A stud $m_3''$ on the other arm of the bell crank $m_3$, as shown in Fig. 1, engages the coupling member $g$ which is constructed as a sleeve having circumferentially bevelled teeth or dogs in known manner for alternative engagement with corresponding teeth or dogs on the toothed wheels $d_1$ and $e_1$.

If the selector bar $k_3$ is moved to the right, thereby turning the lever $l_1$ into the position shown in Fig. 5, then after a certain amount of idle motion the stud $m_1'$ of the bell crank $m_1$ comes into contact with the end of the slot in the head $l_3$ of the bar $l_2$ which turns the bell crank $m_1$ clockwise on the shaft $m_0$. The lever $m_3$ to start with remains in the position shown in Fig. 4, so that while the bell crank $m_1$ is turning the spring $m_2$ is first tensioned until the stud $m_1''$ passes into the dead centre position with respect to the stud $m_3'$ where the straight line connecting the centres of the studs passes through the axis of the shaft $m_0$, whereupon the spring contracts and rocks the bell crank $m_1$ into the terminal position shown in Fig. 5. After the bell crank $m_1$ has moved beyond the dead centre position the spring $m_2$ produces a moment on the bell crank $m_3$ acting in the opposite direction from that in which it has hitherto acted and tending to turn the bell crank $m_3$ anticlockwise, such motion of the bell crank being however prevented to start with by the torque acting on the dogs of the coupling sleeve $g$. The moment this torque is reduced, however, e. g. by throttling the engine, the spring $m_2$ draws the coupling sleeve out of engagement with the toothed wheel $e_1$ so that the bell crank $m_3$ moves over suddenly out of the position shown in Fig. 4 into that shown in Fig. 5. The bevelling of the teeth of the coupling sleeve $g$ enables the sleeve to be brought into engagement with the toothed wheel $d_1$ with the minimum of noise the moment the speed of rotation of the wheel and the coupling sleeve becomes equal.

In moving the coupling sleeve back into the position shown in Fig. 4 the cycle of operations is similar.

For facilitating the operation of the change-over coupling $h$ a mechanism is provided which consists of a forked lever $n$ which is pivoted below the Cardan shaft and embraces the shaft like a stirrup and which engages by means of two jaws $o_1, o_2$ in the groove $o$ of a sleeve $p$ which is slidable on the toothed wheel $f_1$. At its two forked ends $n_1$ and $n_2$ the lever is made T-shaped and is provided with recesses $n_1'$ and $n_2'$ respectively. In these recesses balls $q_1$ and $q_2$ engage, which are held in a bore of the T-shaped end $k_2'$ of the bar $k$. Under the action of a spring $q_3$ the balls are spread apart and forced into the recesses $n_1'$ and $n_2'$.

The sleeve $p$ is provided at one end with a collar $p_1$, and at the other end with a coupling bell $p_2$ which supports the inner cone $r_1$ of a cone coupling. The cone $r_1$ coacts with an outer cone $r_2$ of a coupling bell $s$ which is fixed on the Cardan shaft $b$. Between the jaws $o_1$ and $o_2$ and the bell $p_2$ a ball bearing $t$ is interposed, so that the jaws $o_1, o_2$ cause an engagement of the coupling $r_1$ and $r_2$ to take place practically without friction. On the other hand, the jaws $o_1, o_2$ of the non-rotary forked lever $n$ make rubbing contact with the collar $p_1$ so as to constitute a synchronizing brake when the change-over coupling $h$ is moved to couple the wheel $e_1$ to the shaft $b$. The coupling $r_1, r_2$ is disposed in a separate rear chamber of the gear.

As the lay shaft terminates at the wall of the gear casing separating the rear chamber from the remainder of the casing and does not extend through this chamber, the coupling bells $p_2$ and $s$ are not obstructed in any way by the lay shaft, the axis of which if prolonged would intersect the coupling bells, so that the coupling bells can be made of comparatively large diameter and thereby of considerable efficiency.

The manner in which the various gear ratios are obtained is as follows:—

Assuming the parts to be in the neutral position shown in Fig. 1, in order to change over to the first speed, the selector bar $k_1$ is moved to the left, thereby bringing the toothed wheel $i_1$ into engagement with the wheel $i_2$, the bars $k_2$ and $k_3$ remaining in the position shown in Fig. 1, so that the drive takes place through the gear members $a$—$g$—$e_1$—$e_2$—$c$—$i_2$—$i_1$—$h$—$b$.

For changing over from the first to the second speed, the selector bar $k_1$ is moved to the right to disengage the toothed wheel $i_1$ from the wheel $i_2$ and the bar $k_2$ is also moved to the right so as to move the change-over coupling $h$ into engagement with the toothed wheel $f_1$ and thereby fix the said wheel to the shaft $b$ at the same time the lever $n$ is also carried to the right by the locking device, that is to say by the spring loaded balls $q_1$ and $q_2$ which engage in the recesses $n_1'$ and $n_2'$ respectively, until the jaws $o_1, o_2$ bring the cone coupling $r_1, r_2$ into engagement by means of the ball bearing $t$. By this means the toothed wheel $f_1$ which is in permanent engagement with the lay shaft and the coupling shaft $a$ which is disconnected from the engine by the engine coupling, is brought into frictional engagement with the Cardan shaft $b$ driven from the vehicle and is synchronized with it. On the pressure being increased by the selector bar $k_2$ being displaced further to the right, the balls $q_1$, $q_2$ are forced out of the recesses $n_1'$ and $n_2'$ and the synchronizing coupling is uncoupled from the selector bar. The dogs of the sleeve $h$ can now engage without shock in the corresponding dogs of the toothed wheel $f_1$ and couple the latter with the Cardan shaft. The second speed is thus brought about through the gear members $a$—$e_1$—$e_2$—$c$—$f_2$—$f_1$—$h$—$b$.

In order to change over from the second to the third speed, which in the construction shown is the direct drive, the selector bar $k_2$ is moved to the left so as to bring the change-over coupling $h$ out of engagement with the toothed wheel $f_1$ and into engagement with the toothed wheel $e_1$, the bars $k_1$ and $k_3$ remaining in the position shown in Fig. 1. In the middle position of the change-over coupling $h$ and of the selector bar $k_2$ the balls $q_1$ and $q_2$ again engage in the recesses $n_1'$ and $n_2'$. On the selector bar being displaced further to the left it therefore carries the lever $n$ along with it again and presses the jaws $o_1$ and $o_2$ against the collar $p_1$. Owing to the friction between the stationary jaws and the collar $p_1$ which turns with the toothed wheel $f_1$, the toothed wheel along with the lay shaft and the engine coupling shaft $a$, which are in engagement with it, is braked to a certain degree. This braking action has the purpose of bringing the speeds of revolution of the parts $h$ and $e_1$ which are to be coupled more quickly into correspondence. In the second speed the toothed wheel $e_1$ runs at a higher speed than the Cardan shaft $b$. On the coupling $h$ being disengaged from $f_1$, the toothed wheel $f_1$ is released from the Cardan shaft, the coupling brake acting over the toothed wheel $f_1$ and the lay shaft on the toothed wheel $e_1$ which is thereby braked with respect to the Cardan shaft or the change-over coupling $h$. Thus a more rapid and less noisy engagement of the dogs of $h$ and $e_1$ becomes possible. The direct drive is by way of the gear members $a$—$g$—$e_1$—$h$—$b$.

For changing from the third to the fourth speed the coupling parts of $e_1$ and $h$ remain coupled, while the sleeve $g$ is changed over in the manner above described with reference to Fig. 4 by means of the selector bar $k_3$ which for this purpose is moved to the right, the bars $k_1$ and $k_2$ remaining in the position they occupy for the third speed. This operation can be performed in a known manner without disengaging the engine coupling. The dogs of $g$ and $e_1$ remain in engagement even after the change-over of the spring controlled mechanism $m_1$—$m_2$—$m_3$, as long as there is a driving torque between the engine and the vehicle. At the moment of a change-over in the drive (for instance through throttling the engine) the sleeve $g$ will be changed over suddenly, the inclined dogs of the sleeve $g$ and of the toothed wheel $d_1$ repelling each other until both are running at the same speed and enter into engagement with one another. The drive then takes place through the gear members $a$—$g$—$d_1$—$d_2$—$c$—$e_2$—$e_1$—$h$—$b$.

The gear changes are shown on the left of Fig. 3. I, II, III, IV are the corresponding positions of the common gear lever $k$ and R is the position for the reverse. As will be seen there are two positions for the third speed, according to whether the selector bar $k_2$ (the sleeve $h$) is being changed over from the second speed or the selector bar $k_3$ (sleeve $g$) from the fourth speed. This makes it possible to cause the coupling brake actually to act only when changing from a lower speed into the third or direct speed, but not when changing over to the third or direct speed from the higher or fourth speed. For changing over from the fourth to the third speed the coupling sleeve $g$ is again moved to the right. When changing from the third to the second speed the change-over coupling $h$ is disengaged from the toothed wheel $e_1$ by shifting the selector bar $k_2$ to the right and engaged in the toothed wheel $f_1$ by shifting the selector bar $k_3$ to the left, the synchronizing coupling $r_1$, $r_2$ being again operated. In contradistinction to the coupling brake $p$ which correctly only becomes operative when changing from a lower to a higher speed, the synchronizing coupling is actuated both when changing up and when changing down, which is of considerable advantage, as it is immaterial for synchronization which of the two parts to be synchronized is the more rapidly or more slowly moving one.

In changing from the second to the first speed the change-over coupling $h$ is again disengaged from the toothed wheel $f_1$ by moving the bar $k_2$ to the neutral position shown in Fig. 1 and in place thereof the sliding wheel $i_1$ is brought into engagement with the toothed wheel $i_2$ by moving the selector bar $k_1$ to the left. In the same way a reverse speed wheel which is not shown can be brought into engagement by means of a selector bar $k_0$, for instance simultaneously with the wheels $i_1$ and $i_2$. For these last changes a separate synchronizing device or the like is not provided, as it does not seem necessary in view of the practical conditions. In this case as well separate arrangements for facilitating the gear change might be employed.

In order to change over from first to third speed, the bar $k_1$ is moved to the right and the bar $k_2$ is moved to the left and to change over from the first speed to the fourth speed the bars $k_1$ and $k_3$ are moved to the right and the bar $k_2$ remains in the neutral position.

To effect the change over from the second to the fourth speed, the bar $k_2$ is moved to the left and the bar $k_3$ to the right.

The path moved through by the operating lever $k$ when changing over from one speed to another is shown on the left-hand side of Fig. 3, the positions occupied by the lever $k$ for the various speeds being indicated by Roman numbers, while the position for the reverse is indicated by the letter R. The gate necessary for constraining the lever to travel along the required path is shown separately above the actual position occupied by it for the sake of clearness.

Fig. 6 shows a two-speed gear which corresponds in principle to the gear shown in Fig. 1, but in which the pairs of toothed wheels $d_1$, $d_2$ and $i_1$, $i_2$ are omitted. For the rest the reference letters are the same as in Fig. 1.

What I claim is:

1. In a change speed gear, a gear casing, comprising at least two chambers, a main driving gear shaft extending through both chambers of the gear casing, a lay shaft extending substantially through only one of said chambers, gear sets for producing speed transmissions between the main driving shaft and the lay shaft arranged within the said chamber in which the lay shaft is located and a synchronizing disc coupling on the main driving shaft inside the chamber through which the lay shaft does not extend and having a diameter such that it is intersected by the prolongation of the axis of the lay shaft.

2. In a change speed gear, the combination of a gearshaft, a pair of gear members and a change-over coupling for alternately placing said gear members into and out of driving engagement with the gearshaft, with change facilitating means comprising a sleeve on one of said gear members, said sleeve being axially displaceable but not rotatable with respect to said gear member and having a coupling member rigidly connected to it, a coupling member on the gearshaft arranged to coact with the coupling member on the said sleeve for synchronizing the gearshaft with the gear member having the sleeve thereon, a collar rigidly connected to the sleeve, a non-rotary control member for actuating the sleeve arranged between said collar and the coupling member on the sleeve, so as to bear on one side against the collar, antifriction bearing means interposed between the coupling member on the sleeve and the other side of said non-rotary control member, and operating means for actuating in unison the change-over coupling and the said non-rotary control member, so that when the said operating means is moved into the one control position to couple up the gearshaft by the change-over coupling with the one gear member the coupling member on the sleeve is brought into engagement with the coupling member on the gearshaft substantially with the exclusion of friction between the control member and the coupling member on the sleeve and on the actuating means being moved into the other control position and thereby coupling up the gearshaft through the change-over coupling with the other gear member, the non-rotary control member is forced against the collar on the sleeve, friction is set up between it and the collar so as to produce a synchronizing braking action.

3. In a change speed gear, a driving shaft, a driven shaft, transmission gear members interposed between the driving and driven shafts for transmitting the motion of the former to the latter at one transmission ratio, further transmission gear members interposed between the driving and driven shafts for transmitting the motion of the former to the latter with a higher transmission ratio, change over coupling means for alternately coupling the driving and driven shafts together through the first or second mentioned gear members, change facilitating means operatively connected to the change over coupling means and comprising a synchronizing coupling comprising two coupling members adapted to be brought into engagement with one another, one operatively connected to the driven shaft and the other to the driving shaft through the first mentioned transmission gear members for coupling the driving and driven shafts together on the change over coupling means being operated to couple the first-mentioned gear members to the driving and driven shafts and a synchronizing brake for retarding the motion of one of said shafts on the change-over coupling being operated to couple the driving and driven shafts together through the second-mentioned gear members.

4. In a change speed gear, a driving shaft, a driven shaft, a change-over coupling for coupling the two shafts to one another for producing one speed transmission, a synchronizing coupling comprising two coupling members adapted to be brought into engagement with one another, one operatively connected to the driven shaft and the other to the driving shaft through the first mentioned transmission gear members for synchronizing the speeds of rotation of the two shafts prior to the change-over coupling being put into operation, an actuating bar for the change-over coupling and for the synchronizing coupling including a lever linkage operatively connected to the synchronizing coupling so as to move said synchronizing coupling through a shorter distance, on the actuating bar being operated, than the change-over coupling, and a yielding coupling device between the actuating bar and the synchronizing coupling for interrupting the operative connection between the actuating bar and the synchronizing coupling after the synchronizing coupling has been brought into operation by the actuating bar and before the further movement of the bar necessary for engagement of the change-over coupling.

5. In a change speed gear, a driving shaft, a driven shaft, a countershaft, pairs of constant mesh gear wheels, one wheel of each pair fixed on the countershaft, the other wheel of one pair rotatable on the driving shaft, the other wheel of a second pair rotatable on the driven shaft and the other wheel of a third pair rotatable between the driving and driven shafts, a change-over claw coupling on the driving shaft arranged between the gear wheel thereon and the gear wheel between the driving and driven shafts, a second change-over claw coupling on the driven shaft arranged between the gear wheel thereon and the gear wheel between the driving and driven shafts, a synchronizing device comprising coupling members rotatable respectively with the driven shaft and the wheel thereon for synchronizing the speed of rotation of said shaft and wheel and actuating means for simultaneously actuating the said synchronizing device and the change-over claw coupling on the driven shaft.

6. In a change speed gear, the combination as set forth in claim 3, with actuating means for the change-over coupling and operatively connected to the synchronizing coupling and the synchronizing brake so as to actuate the synchronizing coupling on the change-over coupling being actuated to effect the change from a higher to a lower speed and actuate the synchronizing brake on being actuated to effect the change from a lower to a higher speed.

7. In a change speed gear, a driving shaft, a driven shaft, transmission gear members interposed between the driving and driven shafts for transmitting the motion of the former to the latter at one transmission ratio, further transmission gear members interposed between the driving and driven shafts for transmitting the motion of the former to the latter at another transmission ratio, change-over coupling means for alternately coupling the driving and driven shafts together through the first or second mentioned gear members, change facilitating means comprising a synchronizing coupling, one member of which is operatively connected up to the driven shaft and the other member is operatively connected up to the driving shaft and a braking device for retarding the rotary motion of the one shaft relatively to the other and comprising a brake member connected to the shaft to be braked, so as to rotate with said shaft, and a non-rotary brake member adapted to be brought into braking contact with the first-mentioned brake member, and a common actuating device connected up to the change-over coupling and the change facilitating means, so that prior to the driving and driven shafts being brought into driving connection with one another through the first mentioned gear members, the members of the synchronizing coupling are brought into frictional contact with one another and prior to the driving and driven shafts being brought into driving connection with one another through the second mentioned gear members, the rotating member of the braking device is brought into frictional contact with the non-rotating brake member.

8. In a change speed gear, the combination as set forth in claim 7, in which the common actuating device comprises an actuating bar having an actuating fork for the change-over coupling means, a lever member having a long arm connected to the actuating bar and a short arm connected to the change facilitating means serving for transmitting the motion of the actuating bar to the change facilitating means.

9. In a change speed gear, a driving shaft, a driven shaft, a countershaft, pairs of constant mesh gear wheels, one wheel of each pair fixed on the countershaft, the other wheel of one pair rotatable on the driving shaft, the other wheel of a second pair rotatable on the driven shaft and the other wheel of a third pair rotatable between the driving and driven shafts, a change-over claw coupling on the driving shaft arranged between the gear wheel thereon and the gear wheel between the driving and driven shafts, actuating means for said change-over claw coupling including a snap-over device, a second change-over claw coupling on the driven shaft arranged between the gear wheel thereon and the gear wheel between the driving and driven shafts, a synchronizing coupling device comprising coupling members rotatable respectively with the driven shaft and the wheel thereon for synchronizing the speed of rotation of said shaft and wheel, a synchronizing braking device comprising a brake member rotatable with the wheel upon the driven shaft and a non-rotatable brake member arranged to co-operate with the rotatable brake member, actuating means for the change-over claw coupling on the driven shaft operatively connected to said synchronizing coupling device and synchronizing braking device so as to operate the synchronizing coupling device and the synchronizing braking device alternately, a gear change control member movable to engage separately with the actuating means for the change-over coupling on the driving shaft and the actuating means for the change-over coupling on the driven shaft and guiding means for said gear change control member for permitting engagement thereof with the actuating means for the change-over coupling on the driving shaft only when the actuating means operatively connected to the rotatable brake member is in the position to operate the synchronizing braking device.

10. In a change speed gear, the combination of a gear-shaft, a pair of gear members and a change-over coupling for alternately placing said gear members into and out of driving engagement with the gearshaft, with change facilitating means comprising a sleeve on one of said gear members, said sleeve being axially displaceable but not rotatable with respect to said gear member and having a coupling member rigidly connected to it, a coupling member on the gearshaft arranged to coact with the coupling member on the said sleeve for synchronizing the gearshaft with the gear member having the sleeve thereon, a collar rigidly connected to the sleeve, a non-rotary control member for actuating the sleeve arranged between said collar and the coupling member on the sleeve, so as to bear on one side against the collar, and operating means for actuating in unison the change-over coupling and the said non-rotary control member so that when the said operating means is moved into the one control position to couple up the gearshaft by the change-over coupling with the one gear member the coupling member on the sleeve is brought into engagement with the coupling member on the gearshaft and on the operating means being moved into the other control position and thereby coupling up the gearshaft through the change-over coupling with the other gear member, the non-rotary control member is forced against the collar on the sleeve and friction is set up between it and the collar so as to produce a synchronizing braking action.

MAX WAGNER.